Aug. 16, 1938.   D. E. WORLEY   2,127,196
PRECISION BEARING
Filed July 22, 1936
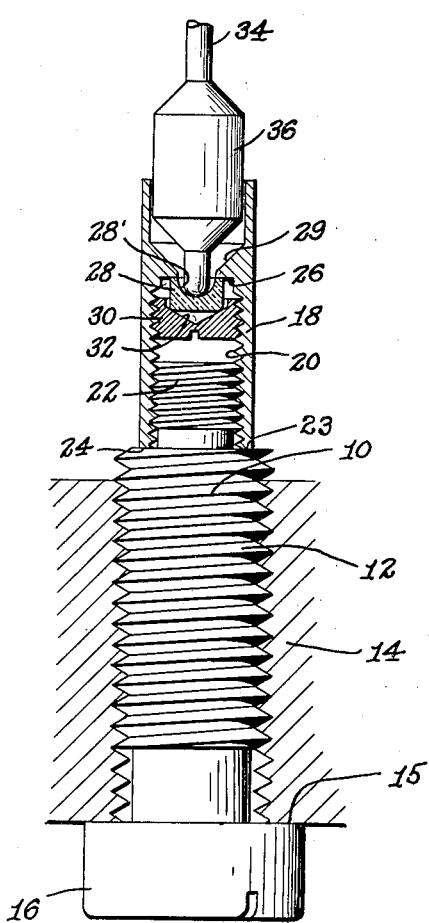
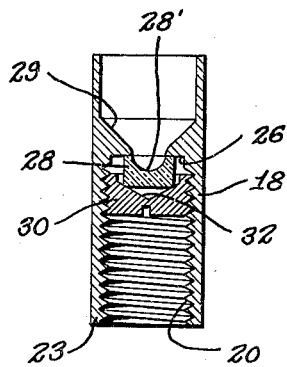
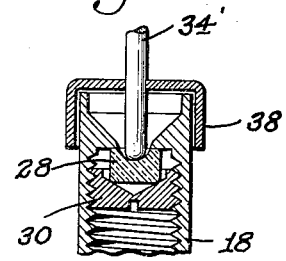
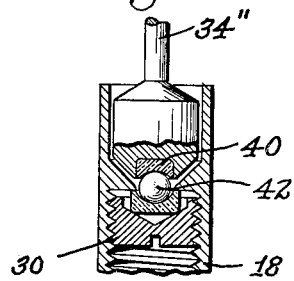
Inventor
DONALD E. WORLEY
by Everett Kent
Attorney Patented Aug. 16, 1938

2,127,196

UNITED STATES PATENT OFFICE 2,127,196

PRECISION BEARING

Donald Eugene Worley, Waltham, Mass.

Application July 22, 1936, Serial No. 91,921

6 Claims. (Cl. 308—159)

This invention relates to improvements in precision bearings.

More especially it relates to the mounting of a jewel bearing, such as a sapphire which in some kinds of apparatus constitutes a step bearing and, for proper operation of the apparatus, must be positioned with great accuracy relative to other parts of the apparatus.

The invention will be herein described in its application to a watt-hour meter, having electromagnetic elements, one of which is a magnetic disk carried on a vertical shaft whose lower end stands and rotates in a cup bearing in a jewel. However, it will be understood that the uses of the invention are not limited to that apparatus. In such a meter it is common practice to renew the jewel bearing every two years or so. For correct meter operation, a precision setting of such a disk is a prerequisite. The invention provides improved structure for facilitating this precision in the replacement of one jewel with another, as well as in initial construction.

Heretofore, according to one practice, the jewel has been made replaceable by setting it in an axial cavity in the end of a removable screw, the metal edges of the cavity being spun over toward the axis so as to cover the margin of the jewel. In such a construction the replacing of the jewel involves a discarding of the screw as well as the old jewel.

By a later development, the jewel is retained in the cavity in the end of a screw by an annulus screwed into that cavity on top of the jewel. But this is open to objection because there has to be a screw-driving groove; the shaft has to enter through the annulus to reach the bearing; and the shaft may become marred on sharp edges when the parts are being assembled or the jewel is being replaced. The apparatus is so delicate that even small scratches may have serious effect in reducing the percentage of actual watthours which the meter records. Also, a mere thousandth of an inch variation in the setting of the bearing surface of the jewel makes a difference in the recording of the meter. The top or bearing face of each jewel can be made precisely like each other, within sufficiently close tolerances, by methods which are known; but the thicknesses and the diameters of different jewels vary. This circumstance has required the person making the replacement to rest the jewel on spacing washers, which he must select or must build up so as to set the middle of the cup-shape top surface of the jewel at precisely the proper level for correct functioning of the operating element it carries. The proper setting of the jewel as to its position along the axis, and the axial centering of the jewel in its cavity, are tasks requiring delicate manipulation; and even with the employing of highly experienced jewel-setters, the company using the meter to measure its sales cannot feel certain that the electricity passing through any particular meter is being correctly measured.

It is among the objects of the present invention to provide a construction of mounting for a jewel bearing wherein the jewel may be accurately set initially; and be replaced by another jewel inexpensively, without this operation calling for high skill. Also it is a feature that everything but the discarded jewel is preserved for re-use, thus losing no fabricated metal parts, and without either losing or using any complicated equipment in making the change; and without the operation presenting any sharp edges on which the pivot shaft may become scratched, either while being inserted or during regular operation. By the construction which the invention provides the bearing surface of the jewel is set with automatic accuracy, at the predetermined location along the axis of the bearing screw and of the apparatus in which its pivot shaft functions, regardless of the thickness-length of jewel in the axial direction; and at the same time there is automatic centering of the jewel relative to the axis of the screw in which it is carried and by which it is set in the apparatus. Another feature is that in a preferred form the improved mounting screw may be separable into sections, one of which, carrying the jewel, is carried removably on the other and is interchangeable with like sections of other similar screws and affords a short quick approach for the jewel and its retaining plug to the position at which the jewel is to be seated.

The invention provides a jewel-holder which is tubular, having interiorly an annular abutment facing endwise of and away from the shaft for which a bearing is to be provided. This abutment, herein called the jewel-abutment, determines the position of the bearing face of the jewel, when the jewel is pressed against it. In the particular apparatus to which reference has been made, a watt-hour meter, the shaft normally stands upright, and the jewel is a step-bearing for the lower end of the shaft. The jewel-abutment therefore faces downward. Correlated with this, and made with the precision of dimension which is characteristic of screw machine products, there is another abutment, herein called the support-abutment, by which the position of the jewel abutment relative to the supporting frame is predetermined, and thus is predetermined relative to any other apparatus which is fixed relative to that support, and which may in fact be the particular element with which the said shaft has to cooperate with such precision of position. This support abutment may have any suitable arrangement, such that it can be set against a fixed seat on the meter frame or other support relative to which positions are fixedly predetermined.

It is intended that the patent shall cover, by suitable expression in the appended claims, whatever features of patentable novelty exist in the invention disclosed, other of which will be found in the detailed description which follows.

In the accompanying drawing:

Figure 1 is an elevation, partly in medial section, on a greatly enlarged scale, of a bearing screw embodying features of the invention;

Figure 2 is an elevation, in medial section, of the jewel carrier portion of the screw of Figure 1, with a jewel mounted therein;

Figure 3 is an elevation, in medial section, of a fragment of a slightly modified form of jewel carrier, showing one form of meter pivot shaft, having a dust cap thereon; and Figure 4 shows still another form of pivot shaft.

Referring to the drawing, the support screw 10 is to afford a step bearing for the shaft 34, which at a higher elevation (not shown) has whatever operating element it may be carrying, assumed in this instance to be a disk such as is ordinary in a watt-hour meter. This support screw supports the jewel 28; and it is itself mounted by its threads 12 which screw into the support or frame 14. The purpose is to make the jewel be placed or replaced with its bearing face in a location which is precisely predetermined relative to this support,—notwithstanding that the replacement may be of variant diameter or thickness. This, because the electro-magnets with which such a disk cooperates are rigid with said support, so that such a precise placement or replacement makes the meter function as planned. The screw 10 has a head 16 whose shoulder-abutment 15, when seated against the support 14, constitutes a support-abutment and fixes precisely the location of the support screw relative to the support, and said other parts with which its disk is to cooperate. The apparatus now to be described can be removed and replaced by movement of this screw; but if this screw be not removed it constitutes in effect a part of the support. The screw 10 may be tubular with opening downward through which the jewel can be inserted and pushed to its seat at the jewel-abutment.

In a preferred form of the invention, the bearing screw is made in two sections, and when so constructed the tubular formation may be only in the upper or jewel section, 18, which is interiorly threaded as at 20, so that it can be screwed on the reduced terminal portion 22 of the main or support section 10 until the end face abutment 23, at the lower end of the tube 18, is seated against the shoulder abutment 24 of the main, or support section. When so seated, and when the shoulder 15 of the head 16 of screw 10 is seated against the frame 14, the relation of the parts within the jewel section 18 to meter frame 14 may for practical purposes be considered as precisely fixed as if the tube 18 and the meter frame were integral.

The tubular or jewel-carrying section 18 projects from the reduced terminal portion 22 of the main screw 10, and has in its midportion an interior annular abutment with radial shoulder 26 facing downward and with conical shoulder 29 facing upward. Shoulder 26 is a fixed seat for the jewel and is far enough away from the end of the support section, which screws into this jewel section, to allow ample clearance for the tube to receive jewel 28 and its screw plug retainer 30. The margin of the top face of the jewel engages this fixed seat, and the cup bearing part of its top face is marked 28' and can be seen to be open upward through the opening which the annular seat surrounds, through which the shaft 34 can reach this bearing, being guided to its center by the conical upward-facing shoulder 29 without there being any sharp or rough surface which might scratch the shaft. Under the annular seat, the interior threads 20 permit a retaining screw plug 30 to be run in for pressing the jewel to its seat; and this plug has a conical or other suitable surface 32 for centering the jewel on the axis as the plug moves upward to press the jewel to its seat. Variations in the thickness of jewels inserted make no difference in the accurate placing of the bearing surface of the jewel against the jewel shoulder 26, and the position of that shoulder relative to the support shoulder 15 can be accurately predetermined by making the parts in question of metal by automatic machining methods, such being already available with sufficient accuracy to attain the high degree of precision desired. The accurate machining of the screw sections 10, 18 fixes the location of the seat 26 relative to the frame 14; and this fixes the bearing surface of every jewel relative to the same, for the depth of bearing surfaces of the jewels from the face 26 can be made uniform; and the thicknesses and varying diameters of the jewels are by the construction described made immaterial.

The main purpose is thus attained, because the magnetic disk or whatever operating element (not shown) is on the shaft 34 is fixed thereon; and the electro-magnet or whatever cooperating elements (not shown) are on the meter frame are fixed thereon; and the distance from support abutment to jewel abutment is fixed, or can always be precisely restored, if these parts are separable as in the illustration here shown, by setting the abutments 23, 24 together; or, of course, is fixed if the part having the shoulder 26 is integral with that having the shoulder 15, in which case the tube for receiving the jewel 27 and its plug 30 would extend through to the lower end of the screw which, in Figure 1, is represented as being solid. In each case the thickness of the jewel is excluded from the line of connection between these abutments.

The invention is applicable to meter installations having any of the various prevalent pivot-shaft constructions, three of the more common of which are illustrated in the drawing. In Figure 1 the pivot shaft 34 has an enlargement 36 nearly filling the chamber at the outer end of jewel carrier 18, where it serves to keep foreign matter from entering the bearing.

Figure 3 illustrates a jewel carrier with shorter projection beyond the jewel seat 26, and with dust cap 38 on the pivot shaft 34'.

In Figure 4 the jewel carrier is similar to that of Figures 1 and 2, but the pivot shaft 34'' has a jewel 40 mounted in its end, and a steel ball bearing 42 rides between the two jewel bearing surfaces. In this case the ball is in effect an end-extension of the shaft, being of size to pass through the annulus and to rest in the jewel in place of the shaft itself.

In each case the length of shaft 34 upward to its disk or other operating element (not shown) is controllable by accurate machining, and therefore that element can be precisely positioned relative to its cooperating parts fixed on frame 14, because of the precise positioning of its bearing jewel. This eliminates the element of guesswork combined with trial and error adjustments hitherto practiced for getting precision setting of the jewel bearing surface.

I claim as my invention:

1. A step bearing for a shaft on a support, comprising a tube having mounting means, including an abutment rigid on the tube for engagement toward the support whereby the position of the tube relative to the support is predetermined; an annular ledge rigid within the tube, having its opening sufficient for the end portion of the shaft to pass through the opening of the annulus, and having an abutment facing away from the main portion of the shaft; a jewel, having a surface for bearing endwise on the shaft; and retaining means for the jewel within the tube, seating the jewel against the annular abutment, independently of the said mounting means for the tube.

2. A step bearing as in claim 1, in which there is a sloping smooth face of the annular ledge on that side of the ledge which is remote from the side thereof abutting the jewel, for smoothly inducting the shaft to the bearing.

3. A step bearing as in claim 1, in which the retaining means is an annulus which is exteriorly screw threaded, for adjustment of the annulus within the tube, and which has interiorly a smooth annular slope for centering the jewel on the axis as it moves the jewel to its said seat.

4. A bearing comprising a jewel; a jewel-carrying element therefor, tubular and having an interior annular jewel-seat, and adapted, at the end toward which said jewel-seat faces, for being mounted on a supporting section; said supporting section; and means independent of the supporting section for maintaining said jewel against the said seat; there being cooperating abutments on the jewel carrying section and the supporting section, for those two to be seated together, whereby the location of the said jewel seat can be predetermined in relation to the support.

5. A mounting for a jewel bearing, comprising a screw having a head and a shank, and having a tubular end portion of its shank removably secured to the main body of its shank; there being a shoulder abutment on the main body of the shank at a distance from the head, and said end portion of the shank having a tube-end abutment seating against said shoulder abutment; an annular seat interiorly of said tubular portion, facing toward said abutments, for engaging the margin of that face of the jewel which has its bearing surface; and means between the seat and the said tube-end abutment, independent of the main body of the screw, for maintaining the jewel on its said seat.

6. A step bearing comprising a jewel and a tubular jewel-carrying element having interiorly a machined abutment facing downward, for seating the margin of the jewel's upward face containing the step bearing surface, thereby determining the position of that face within the tube; removable means within the tube holding the jewel to that seat; and means, independent of said removable means, for mounting said tube on a support, including a machined abutment on the tube for determining the position of the tube relative to the support, whereby the position of the said face of the jewel relative to the support is predetermined by machined abutments on the tube irrespective of the thickness of the jewel.

DONALD EUGENE WORLEY.